United States Patent
Denis et al.

(10) Patent No.: US 9,497,727 B2
(45) Date of Patent: Nov. 15, 2016

(54) RANGE ESTIMATION METHOD BASED ON RSS MEASUREMENT WITH LIMITED SENSITIVITY RECEIVER

(71) Applicant: Commissariat a l'energie atomique et aux ene alt, Paris (FR)

(72) Inventors: Benoit Denis, Grenoble (FR); Laurent Ouvry, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/351,971

(22) PCT Filed: Oct. 16, 2012

(86) PCT No.: PCT/EP2012/070497
§ 371 (c)(1),
(2) Date: Apr. 15, 2014

(87) PCT Pub. No.: WO2013/057108
PCT Pub. Date: Apr. 25, 2013

(65) Prior Publication Data
US 2014/0287776 A1 Sep. 25, 2014

(30) Foreign Application Priority Data
Oct. 17, 2011 (EP) .................... 11290479

(51) Int. Cl.
H04W 4/00 (2009.01)
H04W 64/00 (2009.01)
G01S 5/02 (2010.01)

(52) U.S. Cl.
CPC ............. *H04W 64/00* (2013.01); *G01S 5/021* (2013.01); *G01S 5/0252* (2013.01); *H04W 4/005* (2013.01)

(58) Field of Classification Search
CPC ..... H04W 64/00; H04W 4/02; H04W 4/022; H04W 4/023; H04W 4/025; H04W 4/04; H04W 24/08; H04B 17/11; H04B 17/21; H04B 17/27; H04B 17/391; G01S 5/0252; G01S 5/0268; G01S 5/0278; G01S 5/0284; G01S 5/0289; G01S 5/14; G01S 5/30
See application file for complete search history.

(56) References Cited

U.S. PATENT DOCUMENTS

| 7,962,150 B2 * | 6/2011 | Hertzog et al. ............ 455/456.1 |
| 2004/0022214 A1 * | 2/2004 | Goren et al. .................. 370/332 |
| 2007/0258421 A1 * | 11/2007 | Alizadeh-Shabdiz et al. ............................. 370/338 |
| 2013/0051255 A1 * | 2/2013 | Estevez et al. ............... 370/252 |

(Continued)

OTHER PUBLICATIONS

Deng, Z-I. et al., "Localization algorithm based on a difference estimation for wireless sensor networks in Pervasive Computing Environment", Pervasive Computing and Applications, pp. 479-484, (Oct. 6, 2008) XP031424972.

(Continued)

*Primary Examiner* — George Eng
*Assistant Examiner* — Umair Ahsan
(74) *Attorney, Agent, or Firm* — Oblon, McClelland, Maier & Neustadt, L.L.P.

(57) ABSTRACT

A method for estimating a range between a radio signal emitter and a receiver. A first range estimate is obtained from a signal strength of a received signal and a path loss model with predetermined path loss parameters. This range estimate is further corrected with a systematic bias depending upon an actual finite sensitivity of the receiver. Optionally a corrected variance of the range estimate can be calculated.

7 Claims, 2 Drawing Sheets

(56) References Cited

U.S. PATENT DOCUMENTS

2013/0069760 A1* 3/2013 Lickfelt ............... 340/5.61
2014/0243016 A1* 8/2014 Denis et al. ........... 455/456.1
2014/0256353 A1* 9/2014 Denis et al. ........... 455/456.1

OTHER PUBLICATIONS

Chen, Y. et al., "On the Mechanisms and Effects of Calibrating RSSI Measurements for 802.15.4 Radios", Wireless Sensor Networks, pp. 256-271, (Feb. 17, 2010) XP019138696.
Lee, H. S. et al., "The Method of Location Error Detection and Correcting in Smart Home Environments", Hybrid Information Technology, pp. 432-438, (Nov. 9, 2006) XP032070203.
Arnold, J. et al., "Node Localisation in Wireless Ad Hoc Networks", Networks, pp. 1-6, (Nov. 1, 2007) XP031211045.
International Search Report Issued Jan. 11, 2013 in PCT/EP12/070497 Filed Oct. 16, 2012.
European Search Report Issued May 25, 2012 in European Application No. 11290479.2 Filed Oct. 17, 2011.
Dragos Niculescu et al., "Ad Hoc Positioning System (APS)", Proc. of Global Telecommunications Conference, 2001, pp. 2926-2931.
M. Laaraiedh et al., "Enhancing Positioning Accuracy Through Direct Position Estimators Based on Hybrid RSS Data Fusion" Proc. IEEE VTC'09, 6 pages.
U.S. Appl. No. 14/352,535, filed Apr. 17, 2014, Denis, et al.
U.S. Appl. No. 14/349,903, filed Apr. 4, 2014, Denis, et al.
U.S. Appl. No. 14/739,072, filed Jun. 15, 2015, Dehmas, et al.
U.S. Appl. No. 14/435,370, filed Apr. 13, 2015, Dehmas, et al.
U.S. Appl. No. 14/435,283, filed Apr. 13, 2015, Dehmas, et al.
U.S. Appl. No. 14/435,338, filed Apr. 13, 2015, Ouvry, et al.

* cited by examiner

RANGE ESTIMATION METHOD BASED ON RSS MEASUREMENT WITH LIMITED SENSITIVITY RECEIVER

TECHNICAL FIELD

The present application relates to a range measuring method based on RSS (Received Signal Strength) measurement. This method can be used in wireless sensor networks (WSNs) and more generally in wireless networks.

PRIOR ART

Wireless Sensor Networks (WSNs) can be applied to various areas such as military affairs, commerce, medical care, environment monitoring and have been a subject of intensive research over the last few years. In a wireless sensor network (WSN), data collected by the nodes (sensors) are typically collected and processed by one or more controlling nodes. In many applications (e.g. environment monitoring), processing of the data cannot be performed without knowing the respective positions of the nodes these data are collected from.

Many positioning algorithms have been proposed in the prior art to determine the location of nodes in a WSN. These algorithms generally assume that the position of certain nodes, also called anchor nodes or landmarks, have an a priori knowledge of their coordinates, e.g. by GPS positioning. The (absolute) positions of the other nodes, also called regular nodes, are then inferred from the positions of the anchor nodes.

Basically, positioning algorithms for WSNs fall into two categories: range-free and range-based.

Range-free positioning algorithms do not require that ranges between the nodes are measured from received radio signals. They merely rely on connectivity information (i.e. on whether the nodes can communicate or not). The distances of the regular nodes to the anchor nodes are then approximated on the basis of this information.

Representatives of range-free positioning algorithms are DV-Hop, amorphous, and centroid algorithms. For example a description of the DV-Hop algorithm can be found in the article of D. Niculescu et al. entitled "Ad Hoc positioning system" published in Proc. of Global Telecommunications Conference, 2001, GLOBECOM'01, San Antonio, Tex., USA, pp. 2926-2931. Basically, in DV-Hop each regular node determines its shortest path (in terms of number of hops) with respect to a sufficient number of anchors. Similarly, each anchor node broadcasts its position and determines its shortest path (again, in terms of number of hops) to the remaining anchor nodes. Once an anchor node has determined its shortest paths to all the other anchor nodes, it calculates the average hop size as the ratio of distances and number of hops to all the other anchor nodes. Each regular node can then simply obtain a rough estimate of a distance to an anchor node by multiplying the number of hops to this node with the average hop size. Once the distances to three anchor nodes have been estimated, a coarse position of the node can be obtained by conventional trilateration.

Range-based positioning algorithms obtain point-to-point distance information between neighboring nodes and derive therefrom the location of the regular nodes. A range-based positioning algorithm, known as the WLS algorithm, is described in the article of M. Laaraiedh et al. entitled "Enhancing positioning accuracy through direct position estimators based on hybrid RSS data fusion" published in Proc. IEEE VTC'09, Spring Barcelona, Spain. According to this non-cooperative algorithm, the ranges between regular mobile nodes and anchors are estimated from received signal strength (RSS) observables. Once a regular node has measured a minimum number of observables, it may estimate the ranges to some of the anchor nodes. The coordinates of the regular node are determined as a weighted least square (WLS) solution of an over-determined set of equations, the weighting relying on the covariance matrix of the various range estimates.

More generally, the problem of estimating the position of a user equipment (UE), typically a mobile terminal by using network nodes e.g. access points and radio propagation models can be found in various communication networks such as cellular (GSM, UMTS), WLAN (IEEE 802.11) or WPAN (IEEE 802.15) either for indoor or outdoor environments. A WLAN positioning method using 802.11 access points can be found for example in US patent application US2007/0258421.

Again, most of these positioning methods are based on measuring the strengths of signals received from network nodes of known locations (anchor nodes). The RSS values can be exploited for determining the ranges of the UE to the anchor nodes (range based non-cooperative positioning) and/or the ranges between several mobile UE (range based cooperative positioning).

Range based positioning basically relies on the estimation of a range from a signal strength measured by the UE receiver and a path loss model.

It is recalled that the path loss over a radio link, e.g. between an anchor node and the UE, can be modeled as follows:

$$PL(d) = PL_0 + 10\alpha \log_{10}(d/d_0) \qquad (1)$$

where $$PL_0 = 20 \log_{10}(4\pi f_c d_0/c) \qquad (2)$$

is the path loss experienced by the radio signal at a reference distance $d_0$, d is the distance between the anchor node and the UE, $f_c$ is the center frequency of the radio signal, c is the speed of light, $\alpha$ is the path loss decay exponent.

The path loss decay exponent basically depends upon the type of environment. For example $\alpha=2$ for a line of sight (LOS) configuration in free space but has a higher value in indoor or obstructed environments. In fact, the previous expression only represents the average path loss at the distance d. The measured received signal strength actually varies about a mean value that depends on this path loss and on the average transmit power, according to a zero-mean Gaussian random variable accounting for shadowing. Shadowing is a fluctuation of the attenuation due to the presence of obstacles between the transmitter and the receiver. More specifically, shadowing encompasses absorption, reflection, scattering and diffraction by these obstacles.

The strength of the signal received the UE can be expressed as:

$$P_{Rx}(d) = P_{Tx} + G_{Tx} + G_{Rx} - PL(d) + z = \overline{P_{Rx}(d)} + z \qquad (3)$$

where $P_{Rx}(d)$ is the strength of the received signal at the distance d, $P_{Tx}$ is the power of transmitted signal (expressed e.g. in dBm), $G_{Tx}$ and $G_{Rx}$ are respectively the antenna gains of the transmitter and the receiver (expressed in dBi or dB), z is the above-mentioned centered Gaussian variable with a variance $\sigma_z^2$, and $\overline{P_{Rx}(d)}$ is the average received strength at the distance d (averaged over shadowing uncertainty). The variance $\sigma_z^2$, also called shadowing coefficient, essentially depends on the type of environment in which the network is located.

For a given received signal strength $P_{Rx}$ measured by the receiver of the UE, the distance d can be estimated from (2) and (3), e.g. by the median estimator:

$$\tilde{d}^{med} = \exp(M) \qquad (4)$$

with $$M = \frac{([P_{Tx} + G_{Rx} + G_{Tx} - P_{Rx}] - PL_0)\log(10)}{10\alpha} + \log(d_0).$$

Alternate estimators can be used as explained in the aforementioned article by M. Laaraiedh et al., e.g. the mean estimator, also referred to as the LS (Least Squares) estimator, or the mode estimator, also referred to as the ML (Maximum Likelihood) estimator:

$$\tilde{d}^{LS} = \exp\left(M + \frac{S^2}{2}\right) \qquad (4')$$

$$\tilde{d}^{ML} = \exp(M - S^2) \qquad (4'')$$

with $$S = \frac{\sigma_z \ln 10}{10\alpha},$$

where $\sigma_z$ is the shadowing coefficient of the channel between the UE and the anchor node. $\tilde{d}^{LS}$ and $\tilde{d}^{ML}$ respectively denote the estimate of distance d provided by the LS and the ML estimators.

The respective variances of the distance estimators (4), (4'), (4'') can be rather well approximated based on S, M and the distance estimate $\tilde{d}$, as follows:

$$(\tilde{\sigma}_d^{med})^2 = (\tilde{d}^{med})^2 e^{S^2}(e^{S^2} - 1) \qquad (5)$$

$$(\tilde{\sigma}_d^{LS})^2 = (\tilde{d}^{LS})^2 e^{2S^2}(e^{S^2} - 1) \qquad (5')$$

$$(\tilde{\sigma}_d^{ML})^2 = (\tilde{d}^{ML})^2 (1 - e^{-S^2}) \qquad (5'')$$

The variance of the distance estimator can be used as an indicator of the accuracy of the range estimation.

The median range and the ML estimators perform well. The latter estimators are deemed more accurate than the former but require prior knowledge of the shadowing coefficient. All these range estimators are biased but their biases are acceptable in the ideal situation where the received has an infinite sensitivity. However, in practice, when dealing with real receivers having a limited sensitivity, the bias on distance cannot be neglected anymore, as explained hereinafter.

FIG. 1 represents the probability density function of the received signal strength (RSS), $P_{Rx}$, respectively measured by an ideal receiver and by a non-ideal receiver having a detection threshold $P_{th}$.

It appears that the RSS probability density function for the ideal receiver is represented by a Gaussian curve (210) and the one for the non-ideal receiver (220) has a similar shape but is truncated below $P_{th}$. Strictly speaking, the curve 220 is the conditional probability density function (conditioned on a true detection) multiplied by the probability of detection (hence it is not normalized). It has been represented here for the sake of comparison with the ideal curve.

This truncation affects the range estimation as illustrated in FIG. 2.

FIG. 2 represents indeed the probability density functions of the ranging error $\tilde{d} - d$ for an ideal receiver (230) and a non-ideal receiver (240) (as above, the curve (240) is the conditional probability function and has not been normalized for the sake of comparison with the ideal curve)

Whereas the probability density function 230 is substantially Gaussian and centered, the probability density function 240 is "distorted" and not centered anymore. In the latter case, distance estimation is affected by a systematic bias $\mu_d = E(\tilde{d} - d) \neq 0$ where $E(.)$ is the mathematical expectation. Furthermore, the variance cannot be derived from expressions (5), (5') or (5'') and therefore does not give a correct indication of the range measurement accuracy.

The problem underlying the invention is therefore to propose a new method for range estimation based on RSS measurement which is not affected by the aforementioned shortcomings, in particular which can provide an accurate range estimate, independently from the limited sensitivity of the receiver.

DISCLOSURE OF THE INVENTION

The present invention is defined in the appended independent claims. Various advantageous embodiments are given in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

We consider in the following a radio emitter and a receiver. The radio emitter can be a wireless terminal (UE) such as a mobile phone and the receiver can be a base station. Conversely, the radio emitter can be a base station or an access point of a network and the receiver can be a wireless terminal. The radio emitter and receiver can also be both nodes of a cooperative network such as a WSN network.

It is also assumed that the average power of the emitted signal is known by the receiver, e.g. because the transmitter complies with a given standard or the transmitted signal itself carries data giving the transmission power, or a power level indication is forwarded to the receiver on an auxiliary channel.

It is also assumed that the receiver has a limited sensitivity, namely a received signal strength (RSS) detection threshold $P_{th}$. By RSS detection threshold we mean the lowest power signal strength which the receiver can detect and measure.

Figure 3:
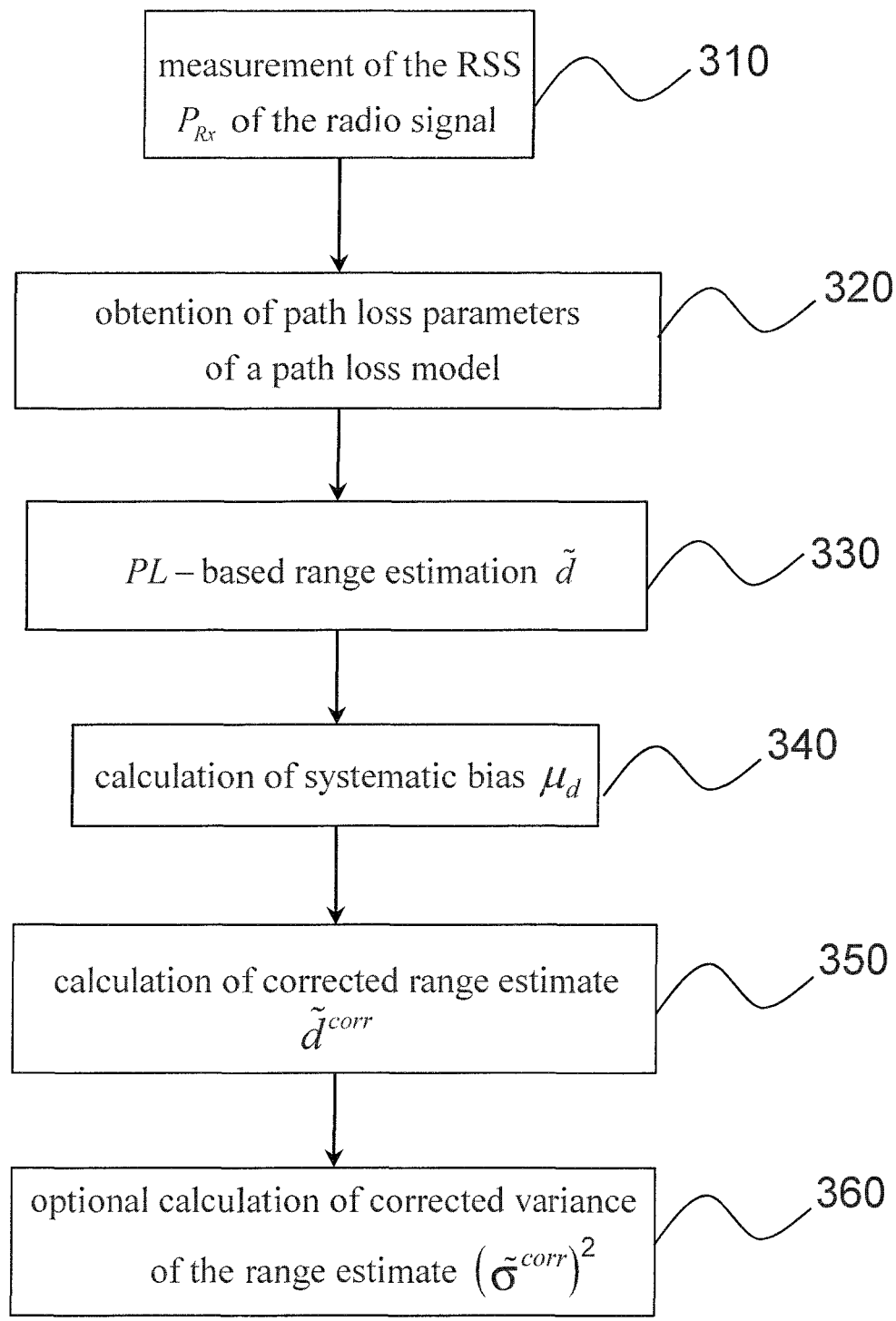
FIG. 3 schematically illustrates a range estimation method according to an embodiment of the invention.

The idea at the basis of the invention is to correct the systematic bias of a distance estimator introduced by the truncation at $P_{th}$ of the probability density function of the received signal strength. Optionally, the variance of the distance estimator is also calculated FIG. 3 diagrammatically illustrates a range estimation method according to an embodiment of the invention.

At step 310, the signal strength $P_{Rx}$ the radio signal transmitted by the emitter is measured at the receiver.

At step 320, the path loss parameters of the channel linking the radio emitter and the receiver are obtained. By path loss parameters, we mean here the parameters of the path loss model in (1) (shadowing-free) or the log-normal shadowing model accounting for the random received signal power in (3). If the log-normal shadowing model is used, the path loss parameters are the path loss value $PL_0$ at a known reference distance, the path loss decay exponent $\alpha$ and, possibly, the shadowing coefficient $\sigma_z$.

The path loss parameters may be obtained by classifying the channel into one of predetermined channel categories, each channel category (e.g. LOS, NLOS, NLOS with deep attenuation) being associated with a set of pre-computed or predetermined standard path loss parameters. Alternately, the path loss parameters may be derived from the type of environment in which the emitter and/or the receiver is located (for example a network node may continuously broadcast this information). In both cases, the standard path loss parameters may have been obtained by previous data collecting campaigns and statistical data analysis.

It should be understood that the path loss parameters may be calculated, or retrieved from a look-up table, either at the radio emitter or at the receiver.

At step 330, a distance estimate $\tilde{d}$ is calculated from the received signal strength measured at step 310 and the path loss parameters obtained at step 320. Again this calculation can be performed at the receiver or at the emitter (the RSS measured being sent to the emitter in the second instance).

In case a log-normal shadowing model is used, the estimate $\tilde{d}$ of the distance can be determined by the median estimator from expression (4), by the mean estimator from expression (4') or by the mode estimator from expression (4").

According to a variant of the present embodiment, the variance of the distance estimate $(\tilde{\sigma}_d^{med})^2$, $(\tilde{\sigma}_d^{LS})^2$, or $(\tilde{\sigma}_d^{ML})^2$, is also estimated in 330 according to (5), (5') or (5") depending upon the estimator envisaged.

By contrast with the prior art, step 340 determines the systematic bias on the distance estimate introduced by the sensitivity limitation of the receiver.

Figure 1:
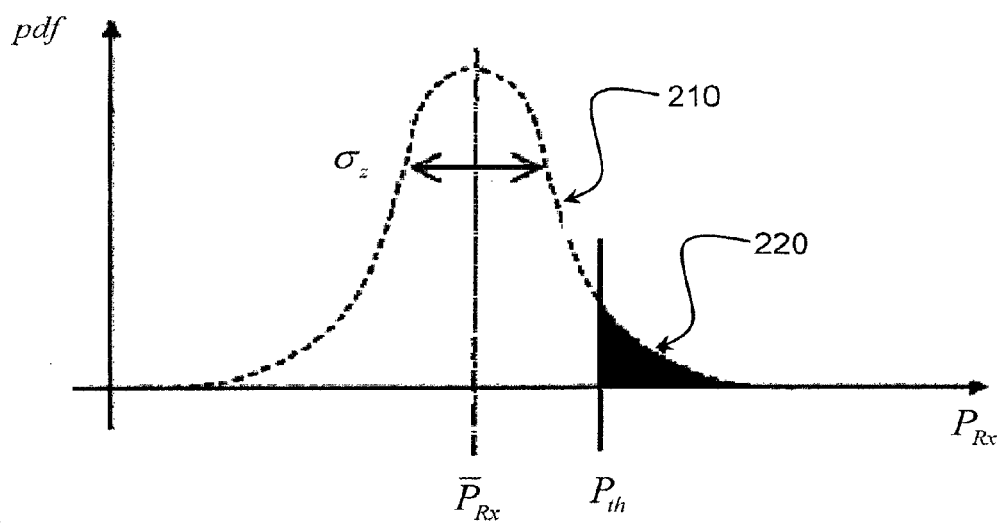
FIG. 1 schematically represents the probability distribution of the received signal strength for an ideal and a non-ideal receiver.
Figure 2:
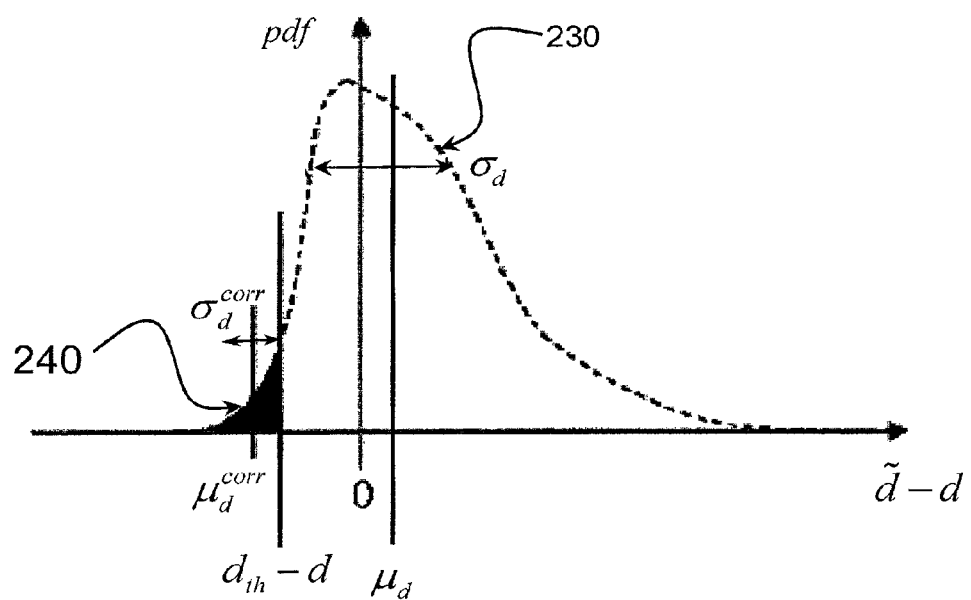
FIG. 2 schematically represents the probability distribution of the distance estimate error for an ideal and a non-ideal receiver.

As already explained in relation with FIGS. 1 and 2, the truncation of the probability density function (pdf) of the received signal strength $P_{Rx}$, due to the limited sensitivity limitation, leads to a distortion of the corresponding pdf of the distance estimate (conditioned upon true detection). This "distortion" can be assessed and captured by the calculation of the moments of the new pdf of the distance estimate.

Importantly, it has been shown that the moments with this distorted pdf (e.g. 240 in FIG. 2) can be obtained as a function of the actual distance value d, the RSS threshold $P_{th}$ and the path loss parameters.

If the pdf of the RSS is truncated below $P_{th}$, the pdf of the distance estimator is truncated above a corresponding distance threshold $d_{th}$ (see curve 240 in FIG. 2 in comparison with the ideal receiver case with infinite sensitivity, 230). It follows that the distance estimate is affected by a systematic bias $\mu_d = E_z(\tilde{d}-d)$ where the expectation value is taken here over z.

The systematic bias can be calculated as:

$$\mu_d = \frac{1}{Pr_{det}} \int_{P_{th}-\bar{P}_{Rx}}^{+\infty} (\tilde{d}-d) pdf(z) dz \qquad (6)$$

where $Pr_{det}$ is the detection rate of the received signal i.e. the probability that the signal strength at the receiver is higher than $P_{th}$:

$$Pr_{det} = \int_{P_{th}}^{+\infty} pdf(P_{Rx}) dP_{Rx} = \frac{1}{2} \text{erfc}\left(\frac{P_{th}-\bar{P}_{Rx}}{\sqrt{2}\,\sigma_z}\right) \qquad (7)$$

where $\bar{P}_{Rx}$ is the mean received power and erfc(.) is the complementary Gauss error function.

Similarly the variance of the truncated pdf, denoted $(\sigma_d^{corr})^2$, can be calculated as:

$$(\sigma_d^{corr})^2 = \frac{1}{Pr_{det}} \int_{P_{th}-\bar{P}_{Rx}}^{+\infty} (\tilde{d}-d)^2 pdf(z) dz - \mu_d^2 \qquad (8)$$

For the sake of simplicity, the results will be given below for the median distance estimator. The man skilled in the art will nevertheless understand that similar results can be obtained for the above-mentioned mean and mode distance estimators.

Recalling that $\tilde{d}=\exp(M)$, where $$M = \frac{([P_{Tx}+G_{Rx}+G_{Tx}-P_{Rx}]-PL_0)\log(10)}{10\alpha} + \log(d_0),$$

it can be shown from (6) that the systematic bias of the distance estimator can be expressed as:

$$\mu_d = d\left[\frac{1}{2\sqrt{2A}\,\sigma_z Pr_{det}} \exp\left(\frac{B^2-4AC}{4A}\right) \text{erfc}\left(\frac{B}{2\sqrt{A}}\right) - 1\right] \qquad (9)$$

with $$A = \frac{1}{2\sigma_z^2},$$

$$B = \frac{\ln(10)}{10\alpha} + \frac{P_{th}-\bar{P}_{Rx}}{\sigma_z^2}, \text{ and}$$

$$C = (P_{th}-\bar{P}_{Rx})\left(\frac{\ln(10)}{10\alpha} + \frac{P_{th}-\bar{P}_{Rx}}{2\sigma_z^2}\right),$$

Similarly, the variance can be expressed as:

$$(\sigma_d^{corr})^2 = \qquad (10)$$
$$d^2\left[\frac{1}{2\sqrt{2A'}\,\sigma_z Pr_{det}} \exp\left(\frac{B'^2-4A'C'}{4A'}\right) \text{erfc}\left(\frac{B'}{2\sqrt{A'}}\right) - 2\left(\frac{\mu_d}{d}\right) - 1\right] - \mu_d^2$$

with $$A' = A,$$

$$B' = \frac{\ln(10)}{5\alpha} + \frac{P_{th}-\bar{P}_{Rx}}{\sigma_z^2},$$

$$C' = (P_{th}-\bar{P}_{Rx})\left(\frac{\ln(10)}{5\alpha} + \frac{P_{th}-\bar{P}_{Rx}}{2\sigma_z^2}\right)$$

The expressions (9) and (10) are parametric functions of the distance d, the detection threshold $P_{th}$, and the path loss parameters.

It has been shown that the bias $\mu_d$ can be neglected when the distance is below a distance $d_{min}$ (related to the reference distance $d_0$) and then approximately behaves linearly. $\chi(d)$ denotes this piecewise linear function.

As for the corrected variance, it can be approximated by an arbitrarily complex non-linear function $\phi(d)$. As an example, for distances below $d_{max}$ (also related to the reference distance $d_0$), this function can be of the form $\phi(d)=\omega(d^n)$, where n=2 and $\omega(.)$ is a linear function. It should be understood that the choice of n is mostly conditioned on the a priori trade-off sought between the tolerated function complexity and the quality of the approximation for $\phi(d)$.

The functions $\chi$ and $\phi$ are parameterized by the RSS threshold, $P_{th}$, and the path loss parameters. They can be fitted to (9) and (10) in a conventional way (e.g. according to a minimum least squares criterion) and stored either as analytical expressions or as look up tables.

Turning back to FIG. 3, the systematic bias $\mu_d$ of the range estimate $\tilde{d}$ is obtained in step 330 as $\mu_d=\chi(\tilde{d})$ and the range estimate $\tilde{d}$ is corrected in step 350 by the bias thus obtained:

$$\tilde{d}^{corr}=\tilde{d}-\chi(\tilde{d}) \qquad (11)$$

Optionally, the corrected variance $(\sigma_d^{corr})^2$ can be obtained from the range estimate in step 360 as $(\sigma_d^{corr})^2=\phi(\tilde{d})$ either by calculation or look-up in a stored table. Alternatively, the corrected distance estimate $\tilde{d}^{corr}$ can be used in place of the distance estimate $\tilde{d}$ to obtain the corrected variance $(\sigma_d^{corr})^2=\phi(\tilde{d}^{corr})$.

The corrected variance provides an indication of the confidence interval for the range estimate.

The corrected variance may also be used to estimate the probability that the distance between the emitter and the receiver lies above or below a predetermined range. To this aim, the estimate of the distance can be regarded as a Gaussian variable centered about $\tilde{d}^{corr}$ and having a variance $(\sigma_d^{corr})^2$.

The invention claimed is:

1. A range estimation method for estimating a range between a radio signal emitter and a receiver of a wireless sensor network (WSN), comprising:
    (a) measuring, by the receiver of the WSN, a strength of a radio signal received from the radio signal emitter;
    (b) obtaining path loss parameters of a path loss model modeling attenuation of a channel between the emitter and the receiver;
    (c) calculating, by the receiver or the emitter of the WSN, an estimate of the range between the emitter and the receiver, based on the path loss model and the path loss parameters thus obtained;
    (d) determining a systematic bias of the estimated range depending upon a power detection threshold of the receiver; and
    (e) correcting the range estimate with the systematic bias to obtain a corrected range estimate, and providing the corrected range estimate as the range estimate between the emitter and the receiver,
    wherein the path loss model is a log-normal shadowing model and the path loss parameters comprise a path loss decay exponent and a shadowing coefficient,
    wherein the corrected range estimate is calculated at (e) by subtracting the systematic bias from the estimate of the range between the emitter and the receiver obtained at (c),
    wherein the systematic bias is determined from the estimate of the range between the emitter and the receiver obtained at (c), the power detection threshold of the receiver, the path loss decay exponent, and the shadowing coefficient, and
    wherein the receiver is one of a mobile wireless terminal and an access point of the WSN, and the emitter is the other of the mobile wireless terminal and the access point of the WSN.

2. A range estimation method according to claim 1, wherein the path loss decay exponent and the shadowing coefficient are determined according to a category of the channel, the category of the channel being one of line of sight, non line of sight, and non line of sight with deep attenuation.

3. A range estimation method according to claim 1, wherein said calculating the estimate of range between the emitter and the receiver at (c) is obtained using a median estimator.

4. A range estimation method according to claim 1, wherein a corrected variance of the estimated range is determined from the range estimate, the power detection threshold of the receiver, the path loss decay exponent, and the shadowing coefficient.

5. A range estimation method according to claim 1, wherein a corrected variance of the estimated range is determined from the corrected range estimate, the power detection threshold of the receiver, the path loss decay exponent, and the shadowing coefficient.

6. A range estimation method according to claim 4, wherein the corrected variance is used to provide an interval of confidence of the estimated range.

7. A range estimation method according to claim 4, wherein the corrected variance is used to calculate a probability that the range between the emitter and the receiver is higher or lower than a predetermined value.

* * * * *